United States Patent [19]

Shikata

[11] Patent Number: 5,288,140
[45] Date of Patent: Feb. 22, 1994

[54] PARKING BRAKE CONTROLLER WITH SLOWER ACTUATION IN THE EVENT OF A MALFUNCTION

[75] Inventor: Kiyoshi Shikata, Neyagawa, Japan
[73] Assignee: Daikin Clutch Corporation, Osaka, Japan
[21] Appl. No.: 820,785
[22] Filed: Jan. 15, 1992
[30] Foreign Application Priority Data
  Jan. 16, 1991 [JP] Japan .................. 3-004734[U]
[51] Int. Cl.⁵ .................................... B60T 7/00
[52] U.S. Cl. .......................... 303/72; 303/84.1
[58] Field of Search ............ 188/151 A; 303/9, 9.62, 303/71, 72, 73, 84.1, 84.2, 92, 3
[56] References Cited

U.S. PATENT DOCUMENTS

| | | | |
|---|---|---|---|
| 3,610,700 | 10/1971 | Beck et al. | 303/72 X |
| 3,999,462 | 12/1976 | Chamberlain | 303/72 X |
| 4,057,297 | 11/1977 | Beck et al. | 303/71 |

Primary Examiner—Robert J. Oberleitner
Assistant Examiner—Josie A. Ballato

[57] ABSTRACT

A hydraulic parking brake controller for a motor vehicle for controlling the operation of a parking brake of the transmission output-shaft mounted type in response to the operating unit. The controller comprises a primary control and a secondary control. The primary control actuates and releases the parking brake at a first rate. The secondary control actuates the parking brake at a second rate slower than the first rate in an instance in which the parking brake is in the released state and the operation unit malfunctions. If a circuit break should occur in the operation unit while the parking brake is in the released state, the secondary control actuates the parking brake at the second rate. The parking brake is thus not actuated suddenly in the event of an abrupt wire disconnection, such that the braking action is dampened.

9 Claims, 5 Drawing Sheets

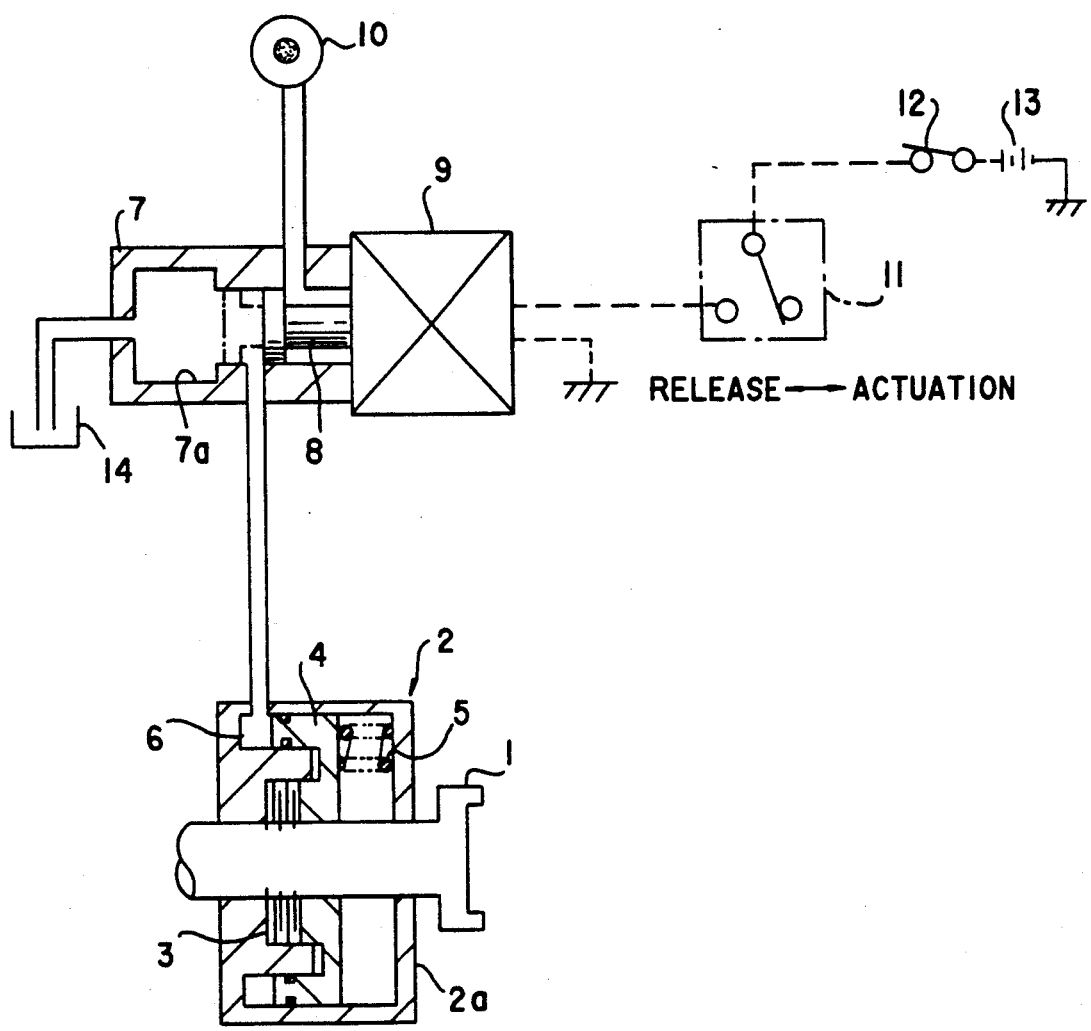

PARKING BRAKE CONTROLLER WITH SLOWER ACTUATION IN THE EVENT OF A MALFUNCTION

BACKGROUND OF THE INVENTION

The present invention relates generally to a hydraulic parking brake controller of a motor vehicle and, more specifically, to a hydraulic parking brake controller used in construction machines and industrial vehicles in order to control, in response to an operation unit, the operation of a hydraulic parking brake provided at the vehicle output shaft.

Parking brake controllers have been installed in construction machines and industrial vehicles. In those vehicles a drum type or a disc type parking brake is provided on the output shaft of a vehicle transmission, which brake is operated by an operator manually in order to brake the output shaft.

Nowadays, other brake controllers have been developed in which a normally-engaged type parking brake on the transmission output shaft is released by hydraulic pressure. A conventional brake controller of this type is shown in FIG. 5 and illustrates a parking brake 2 provided around an output shaft 1 of a transmission. The parking brake 2 comprises a case 2a secured to a housing of the motor vehicle, a plurality of brake discs 3, a piston 4 and a spring 5 for urging the piston 4 axially against brake discs 3. Some of the brake discs 3 are engaged with the case 2a so as to be slidable in the axial direction yet non-rotatable. Other of the brake discs 3, interlaminated with the former discs, are non-rotatably engaged with the output shaft 1 and are slidable in the axial direction. The piston 4 is driven leftward in FIG. 5 by the spring 5 to compress the brake discs 3, thereby braking the output shaft 1.

A directional control valve 7 is connected to an oil chamber 6 defined by the case 2a of the parking brake 2. The directional control valve 7 comprises a case 7a, a piston valve 8 and a solenoid 9 which extends or retracts the piston valve 8 in order to control the engagement and the release of the parking brake 2. The directional control valve 7 is connected to a hydraulic power source 10 and a reservoir 14. The hydraulic power source supplies hydraulic fluid to the directional control valve 7. The solenoid 9 provides on-off control in response to signals from an operation unit 11 installed at the driver's seat, which unit 11 is connected to an electric source 13 through a main switch 12.

When the contact of the operation unit 11 is switched over to its actuation terminal, the solenoid 9 switches off, moving the piston valve 8 to the position shown by the solid lines in FIG. 5. As a result, the hydraulic fluid in the oil chamber 6 of the parking brake 2 drains into the reservoir 14 through the oil chamber 7a of the directional control valve 7 whereupon the brake discs 3 are compressed under the urging force of the spring 5 between the brake housing and the piston 4. Thus the output shaft 1 is braked.

When the contact of the operation unit 11 is switched over to its release terminal, the solenoid 9 switches on, moving the piston valve 8 to the position shown by the dashed lines in FIG. 5. Thereupon, hydraulic fluid is supplied to the oil chamber 6 of the parking brake 2 from the hydraulic power source 10, so that the piston 4 moves rightward in FIG. 5 against the urging force of the spring 5, whereby the output shaft 1 can rotate freely.

If the circuit to the solenoid 9 in the aforedescribed parking brake controller, should become broken or short, the solenoid 9 switches off, actuating the parking brake 2. Thus in the event of electrical malfunction or it the hydraulic system is otherwise out of order, the parking brake will nonetheless be engaged.

However, in the conventional brake controllers, the hydraulic fluid in the oil chamber 6 of the parking brake 2 is drained very suddenly when the solenoid 9 is deactivated on account of electrical malfunction such as wire breaks, such that the brake is engaged too suddenly. The strong jolting of such sudden braking can be very dangerous to machine operators.

SUMMARY OF THE INVENTION

It is an object of the present invention to dampen the shock which attends the sudden braking of a hydraulic parking brake operational on the transmission output shaft of a motor vehicle in instances of malfunction such as circuit wire disconnection.

A hydraulic parking brake controller of a motor vehicle according to an aspect of the present invention controls a parking brake to the output shaft of a motor vehicle in response to an operation unit, and comprises a primary control means and a secondary control means.

The primary control means actuates at a first rate and releases the parking brake. The secondary control means actuates the parking brake at a second rate slower than the first rate in the event that the parking brake is in the released state and the operation unit malfunctions.

The main control means of the parking brake controller controls the parking brake in response to the operation unit, actuating it, or releasing it, at the first rate. Should the operation unit malfunction during the released condition of the parking brake, the secondary control means actuates the parking brake at the second, slower rate. Therefore, since the parking brake is not actuated suddenly in the event of abrupt circuit disconnection, the braking shock which would otherwise result is dampened.

The foregoing and other objects, aspects and advantages of the present invention will become apparent from the following detailed description when taken in conjunction with the accompanying drawings.

BRIEF DESCRIPTION OF THE DRAWINGS

FIG. 5 is a schematic view showing the structure of a conventional hydraulic parking brake.

DESCRIPTION OF THE PREFERRED EMBODIMENT

Figure 1:
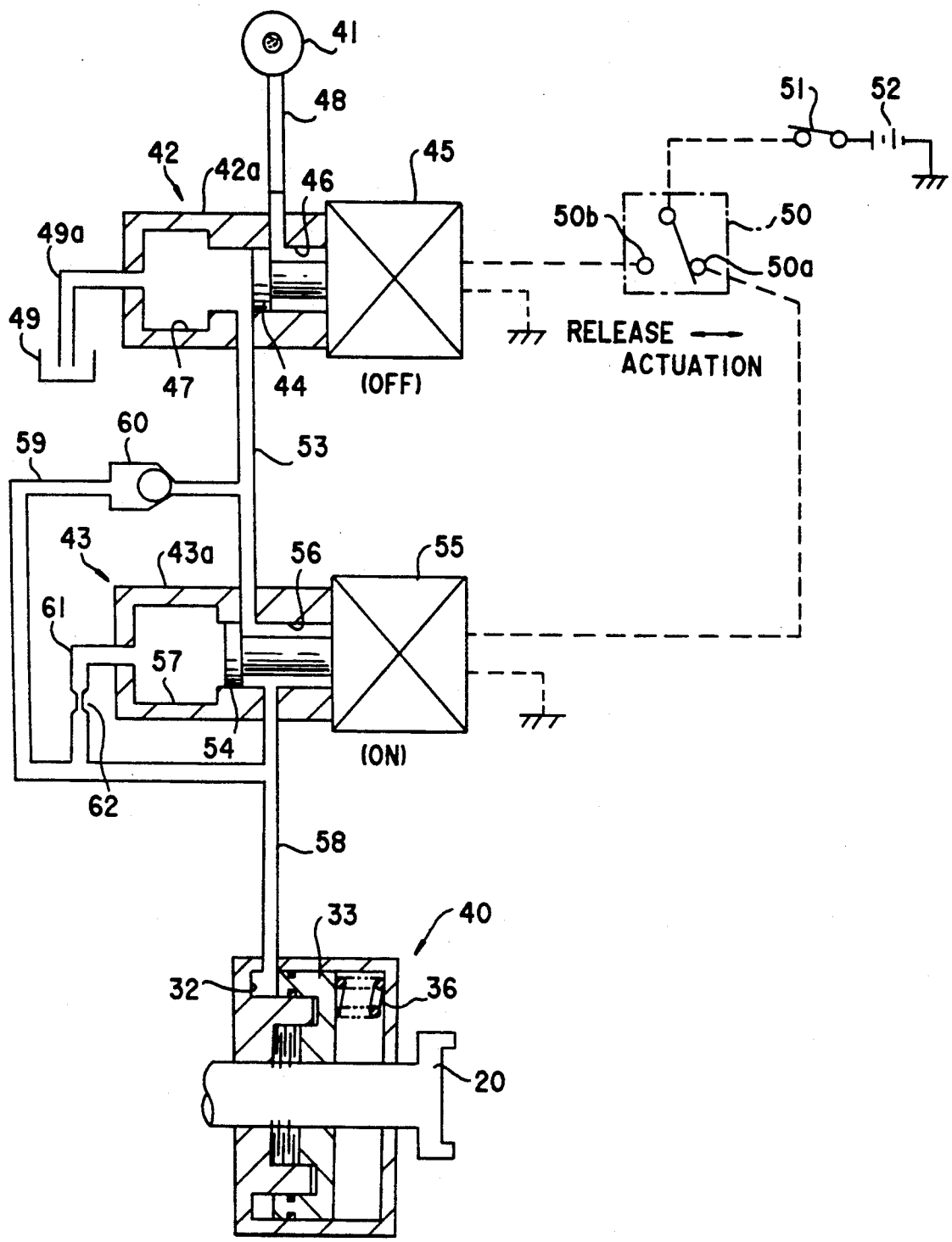
FIG. 1 is a schematic view showing the general structure of the hydraulic parking brake controller according to an embodiment of the present invention.

To begin with, the structure associated with the output shaft portion of a transmission of a motor vehicle to which the embodiment diagrammed in FIG. 1 is installed will be explained with reference to FIG. 2.

Therein it will be seen that the end (rightward in FIG. 2) of a transmission output shaft 20 constitutes a spline shaft 21, with which a brake gear 22 is in splined engagement. A flange 23 is secured to the output end of the output shaft 20. The output shaft 20 is supported rotatably through a bearing 24 by an end casing 25, to which a brake housing 26, embodying a parking brake 40, is joined. A cover 27 is mounted to the rear end of the brake housing 26.

The brake housing 26 is annular, and has splines 28 formed along the interior of its hub. The peripheries of a plurality of brake discs 29 engage with the splines 28 and thus cannot rotate relative to the housing 26, but can slide axially. A splined sleeve 30 encompasses the brake gear 22, and the radially inward margins of a plurality of brake discs 31 are engaged with the splines of the splined sleeve 30, whereby the brake discs 31 cannot rotate relative to the splined sleeve 30 but can slide axially. The brake discs 29 and 31 are interlaminated. An annular oil chamber 32 surrounds the hub containing the splines 28 of the brake housing 26. A brake piston 33 is slidably fitted into the oil chamber 32. A seal is fitted between the oil chamber 32 and the brake piston 33. An annular pressing member 34 is so disposed in the brake housing 26 as to move axially in conjunction with the brake piston 33. A radially flanged portion of the pressing member 34 is retained in a radially inward recess of the brake piston 33, and the radially inward bulk of the pressing member 34 presses against a washer 35. The washer 35 is slidably splined to the splines 28 in the hub of the brake housing 26. A plurality of springs 36 disposed between the pressing member 34 and the cover 27 impel the pressing member 34 toward the end casing 25, and thus, in turn, press the brake discs 29 and 31 against one another through the washer 35. The springs 36 are located at given circumferential spacings.

Figure 2:
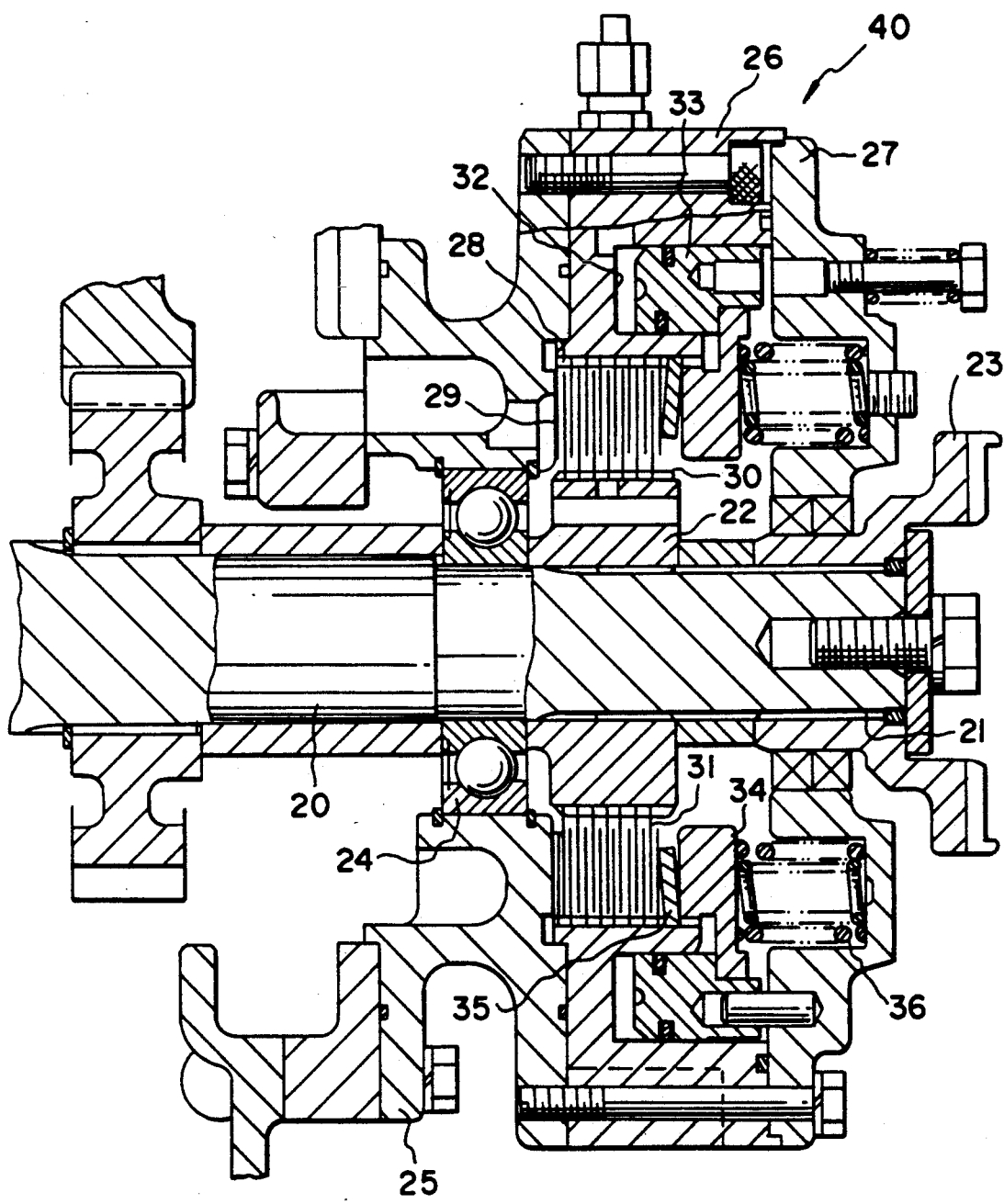
FIG. 2 is an axial cross-sectional view showing the structure of the hydraulic parking brake of FIG. 1.

As shown in FIG. 1, a main directional control valve 42 and a flow control valve 43 are located between the parking brake 40 illustrated in detail in FIG. 2 and a hydraulic power source 41.

The main directional control valve 42 comprises a casing 42a, a first piston valve 44, and a first solenoid 45 which operates the first piston valve 44. The first piston valve 44 separates an oil chamber defined by the casing 42a into a first chamber 46 and a second chamber 47. The first chamber 46 is connected to the hydraulic power source 41 through a passage 48 and the second chamber 47 is connected to a reservoir 49 through a passage 49a.

The first solenoid 45 is on-off controlled by an operation unit 50 installed in the driver's seat of the motor vehicle. The operation unit 50 is a relay device and includes an actuation terminal 50a and a release terminal 50b, and is connected to an electric source 52 through a main switch 51. When the contact of the operation unit 50 is switched over to the actuation terminal 50a, the first solenoid 45 switches off, retracting the first piston valve 44 from the second chamber 47 and closing off the first chamber 46. When the contact of the operation unit 50 is switched over to the release terminal 50b, as shown in FIG. 3 the solenoid 45 switches on, extending the first piston valve 44 through the first chamber 46 and closing off the second chamber 47.

The main directional control valve 42 is connected to the flow control valve 43 through a passage 53. The flow control valve 43 comprises a casing 43a, a second piston valve 54, and a second solenoid 55 which operates the second piston valve 54. The second piston valve 54 separates an oil chamber defined by the casing 43a into a first chamber 56 and a second chamber 57. The first chamber 56 connects the passage 53 and a passage 58 which is connected to the oil chamber 32 of the parking brake 40. A bypass 59 is provided which forms a communication between the passage 53 and the passage 58. The bypass 59 permits hydraulic fluid from the passage 53 to flow to the passage 58, and prohibits reverse flow by means of a one-way valve 60. In addition, a passage 61 branching off a portion of the bypass 59 between the one-way valve 60 and the passage 58 is connected to the second chamber 57 of the flow control valve 43 and has a restriction 62.

The second solenoid 55 is connected to the actuation terminal 50a of the operation unit 50 and on-off controlled thereby. When the contact of the operation unit 50 is switched over to the actuation terminal 50a, the solenoid 55 switches on, extending the second piston valve 54, passing through the first chamber 56 and closing off the second chamber 57. When the contact of the operation unit 50 is switched over to the release terminal 50b, the second solenoid 55 switches off, retracting the second piston valve 54 from the second chamber 57, which connects the passage 53 and the passage 61, and shutting off the first chamber 56.

Figure 3:
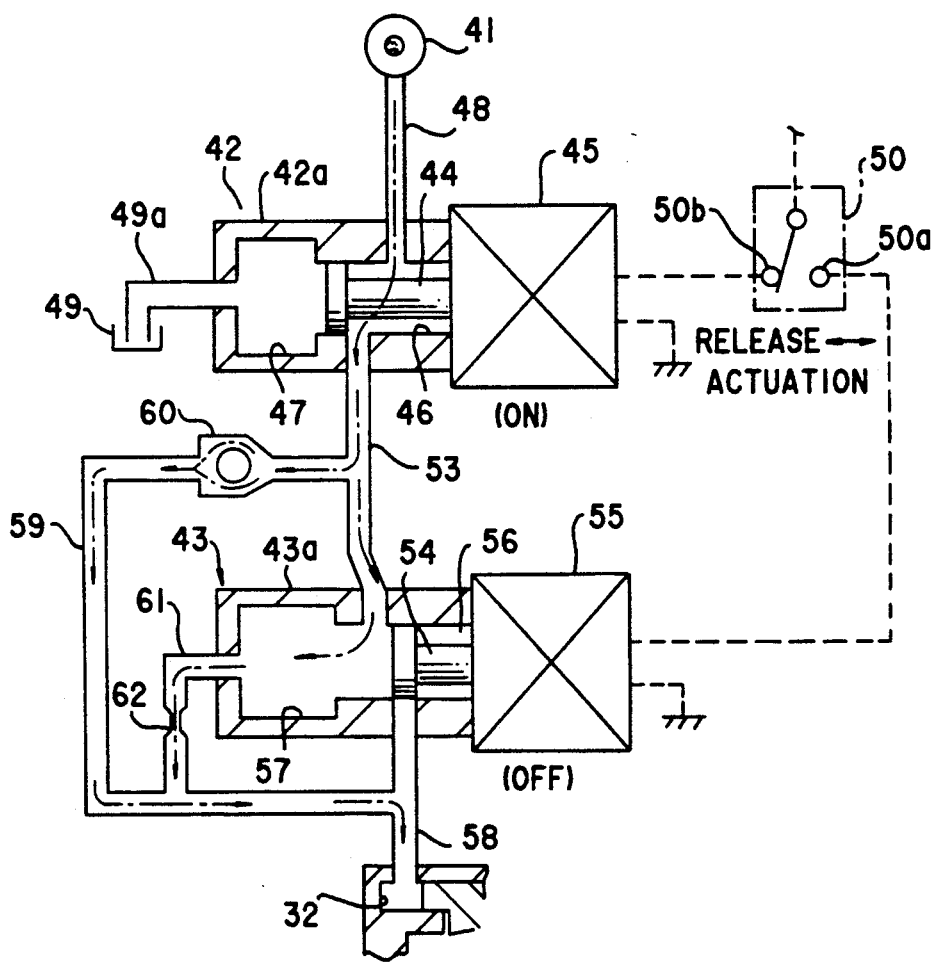
FIG. 3 is a view illustrating one condition of the action of the hydraulic parking brake controller.

Normally during driving, the contact of the operation unit 50 remains switched over to the release terminal 50b, as shown in FIG. 3, wherein the first solenoid 45 is on, and the first piston valve 44 is extended; and the second solenoid 55 is off, and the second piston valve 54 is retracted. That is, the first chamber 46 of the directional control valve 42 and the second chamber 57 of the flow control valve 43 allow the passage of fluid.

At this time, the hydraulic fluid flows from the hydraulic power source 41 to the first chamber 46 of the main directional control valve 42 through the passage 48 and in turn to the chamber 32 of the parking brake 40 through the passage 53, the one-way valve 60, the passage 59, and the passage 58. The hydraulic fluid also flows through the second chamber 57 of the flow control valve 43 and the passage 61 having the restriction 62. If the bypass 59 and one-way valve 60 were not provided, the hydraulic fluid would still be able to flow into the chamber 32, through the second chamber 57 of the flow control valve 43 and the passage 61. However, in that case the hydraulic fluid would be supplied to the chamber 32 too slowly, because it could then pass only through the restriction 62 of the passage 61.

When hydraulic fluid flows into the chamber 32, the brake piston 33 as shown in FIG. 2 is driven out of the chamber 32 along with the pressing member 34 against the urging force of the springs 36. Thereby, the brake discs 29 and the brake discs 31 are separated from one another, allowing the output shaft 20 to rotate freely.

When the contact of the operation unit 50 is switched over to the actuation terminal 50a, the first solenoid 45 switches off and the second solenoid 55 switches on as shown in FIG. 1. As a result, the movement of first piston valve 44 brings the passage 49a and the passage 53 into communication through the second chamber 47 and the movement of the second piston valve 54 brings the passage 53 and the passage 58 into communication through the first chamber 56. Thus, the oil chamber 32 of the parking brake 40 is in communication with the reservoir 49 through the passage 58, the first chamber 56 of the flow control valve 43, the passage 53, the second chamber 47 of the main directional control valve 42, and the passage 49a. The hydraulic fluid in the oil chamber 32 thus drains allowing the urging force of the springs 36 shown in FIG. 2 to impel the pressing member 34 in the direction compressing the brake discs 29 and 31 against the end casing 25. Thus, the brake gear 30, that is, the output shaft 20 stops rotating, whereby the brake is actuated.

Figure 4:
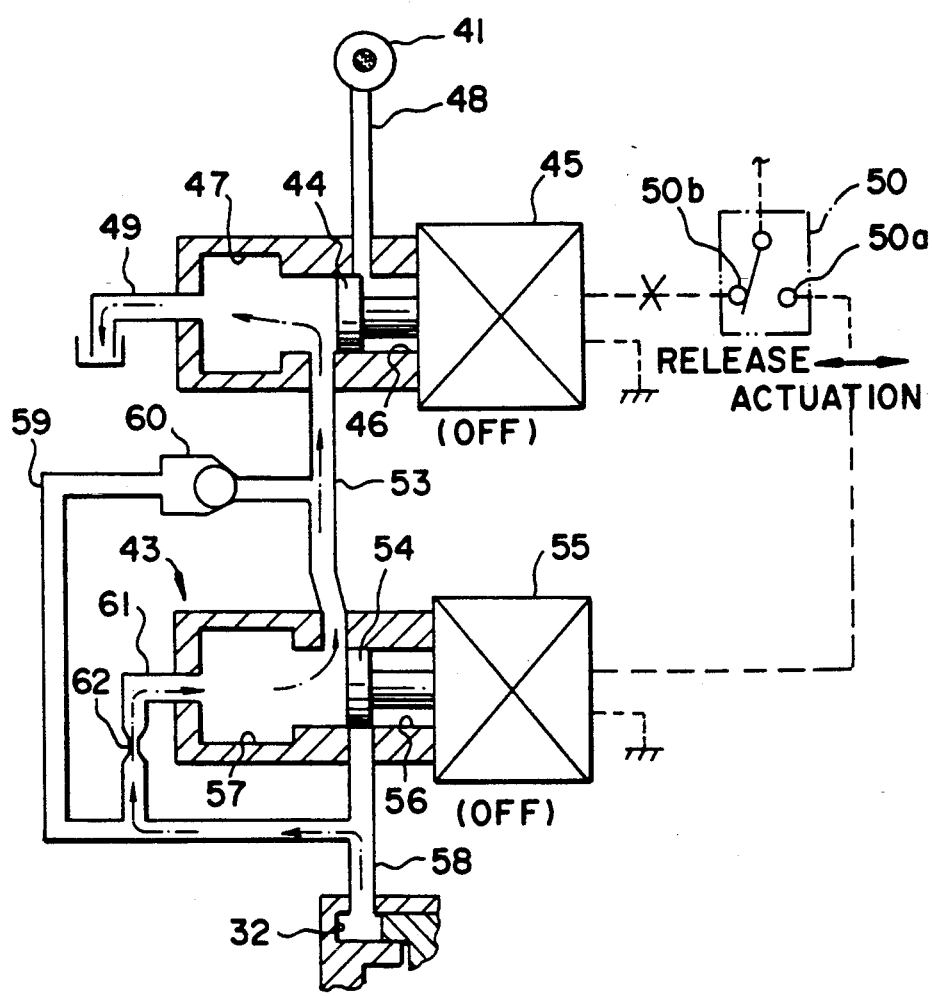
FIG. 4 is a view showing another condition of the action of the hydraulic parking brake controller.

When the motor vehicle is operating normally, the parking brake controller is in the released state as shown in FIG. 3. During that condition, if the electrical connection between the operation unit 50 and the first solenoid 45 or between the operation unit 50 and the power source 52, FIG. 1, breaks, both the first solenoid 45 and the second solenoid 55 switch off, as shown in FIG. 4. Then, the first piston valve 44 and the second piston valve 54 are retracted. The first chamber 46 is thus closed off by the first piston valve 44 and no hydraulic fluid can flow from the hydraulic power source 41 toward the oil chamber 32 of the parking brake 40. Meanwhile, the first chamber 56 of the flow control valve 43 is closed off by the second piston valve 54. As a result, the hydraulic fluid flows from the oil chamber 32 through the passage 58, and in the bypass 59 is prohibited from flowing through by the one-way valve 60. The only fluid communication with the oil chamber 32 is through the passage 61, having the restriction 62, and the second chamber 57 of the flow control valve 43. Thus the hydraulic fluid flows slowly through the restriction 62 and into the second chamber 57, and finally drains into the reservoir 49 through the passage 53 and the second chamber 47 of the main directional control valve 42.

In the aforementioned operation, the hydraulic fluid drains from the oil chamber 32 slowly through the restriction 62 such that the brake piston 33 in the parking brake 42 travels slowly. That is, the brake discs 29 and 31 are slowly engaged, whereby actuation of the parking brake 40 is not sudden.

According to the aforementioned embodiment, the normal release and engagement of the brake can be effected as rapidly as ever. Yet in instances of circuit disconnection the brake is actuated slowly by agency of the restriction 62, dampening what would otherwise be the shocking jolt of uncommanded braking.

Various details of the invention may be changed without departing from its spirit nor its scope. Furthermore, the foregoing description according to the present invention is provided for the purpose of illustration only, and not for the purpose of limiting the invention as defined by the appended claims and their equivalents.

What is claimed is:

1. A hydraulic parking brake controller for controlling a parking brake on an output shaft of a motor vehicle in response to an operation unit, comprising;
  a primary control means for actuating said parking brake when said operation unit is operated to be in an actuating position, and for releasing said parking brake when said operation unit is operated to be in a released position; said primary control means, when in said released position, effecting actuation of said parking brake upon malfunction of said operation unit; and
  a secondary control means responsive to said primary control means, when said operating unit is in said actuating position, for actuating said parking brake at said first rate and for restricting the actuation of said parking brake upon malfunction of said operating unit to a second rate slower than said first rate.

2. A hydraulic parking brake controller according to claim 1, in which said primary control means and secondary control means actuate and release said parking brake by means of hydraulic pressure.

3. A hydraulic parking brake controller according to claim 2, in which said primary control means is located between a hydraulic power source and said secondary control means, and said secondary control means is located between said primary control means and said parking brake.

4. A hydraulic parking brake controller for controlling a parking brake on an output shaft of a motor vehicle in response to an operation unit, comprising;
  a primary control means for actuating at a first rate and releasing said parking brake in response to the operation of said operation unit;
  a secondary control means for actuating said parking brake at a second rate lower than said first rate in an instance in which said parking brake is in the released state and said operation of said operation unit malfunctions;
  said primary control means and secondary control means actuate and release said parking brake by means of hydraulic fluid;
  said primary control means being located between a hydraulic power source and said secondary control means, and said secondary control means being located between said primary control means and said parking brake;
  said primary control means being a directional control valve capable of directing the hydraulic fluid flow when said primary control means is in a first position so that the hydraulic fluid flows from the hydraulic power source toward said parking brake and in a second position so that said hydraulic fluid drains from said parking brake into a reservoir; and
  said secondary control means being a flow control valve which, when said secondary control means is in a first position supplies the hydraulic fluid from said primary control means to said parking brake and, when said secondary control means is in a second position supplies the hydraulic fluid in said parking brake to said primary control means while restricting the rate of flow.

5. A hydraulic parking brake controller according to claim 4, in which
  said directional control valve includes a first port connected to said hydraulic power source, a second port connected to a first port of said flow control valve, and a third port connected to said reservoir,
  said flow control valve includes a second port connected to said parking brake, and a third port connected to said parking brake through a flow restriction.

6. A hydraulic parking brake controller according to claim 5, in which
  said operation unit outputs a release signal when said parking brake is to be released and outputs an actuation signal when said parking brake is to be actuated,
  said directional control valve shifts in response to said actuation signal into such a position as to connect said second and third ports of said directional control valve, and, in response to said release signal, into such a position as to connect said first and third ports of said directional control valve, said flow control valve shifts in response to said actuation signal into such a position as to connect said first and second ports of said flow control valve, and in response to said release signal, into such a position as to connect said first and third ports of said flow control valve.

7. A hydraulic parking brake controller according to claim 6, in which said directional control valve and said flow control valve includes solenoids connected to both of the valves operated by said actuation and release signals for effecting the connections of said ports.

8. A hydraulic parking brake controller according to claim 7, further comprising:
   a connection passage for connecting said directional control and flow control valves,
   a bypass passage branched out of said connection passage and connected to said parking brake, and
   a one-way valve provided in said bypass passage permitting the hydraulic fluid to flow from said directional control valve to said parking brake and prohibiting the hydraulic fluid from flowing from said parking brake to said directional control valve.

9. A hydraulic parking brake controller according to claim 8, said parking brake comprising:
   a brake case connected to the second port of said flow control valve, said brake case housing said parking brake on said output shaft and having splines along an interior wall,
   a plurality of first brake discs splined to splines along an inner wall of said brake case so as to be axially slidable in said brake case and non-rotatable therein,
   a plurality of second brake discs splined to splines along said output shaft so as to be axially slidable on said output shaft and non-rotatable thereon, said second brake discs being interlaminated with said first brake discs,
   an abutment member abutting against one of said first and second brake discs for sliding said brake discs on said spliner, and
   an urging means for urging said abutment member against said one of said first and second brake discs for engaging said brake discs.

* * * * *